(12) United States Patent
Watanabe (10) Patent No.: US 10,305,779 B2
(45) Date of Patent: May 28, 2019

(54) AD HOC NETWORK ROUTE CONSTRUCTION SYSTEM, NODE, AND CENTER NODE

(71) Applicant: KYOCERA DOCUMENT SOLUTIONS INC., Osaka (JP)

(72) Inventor: Takehiro Watanabe, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 11 days.

(21) Appl. No.: 15/867,446

(22) Filed: Jan. 10, 2018

(65) Prior Publication Data

US 2018/0205633 A1 Jul. 19, 2018

(30) Foreign Application Priority Data

Jan. 17, 2017 (JP) .................................. 2017-005697

(51) Int. Cl.
*H04L 12/28* (2006.01)
*H04L 12/751* (2013.01)
(Continued)

(52) U.S. Cl.
CPC ............ *H04L 45/026* (2013.01); *H04L 45/24* (2013.01); *H04L 45/26* (2013.01); *H04L 45/32* (2013.01);
(Continued)

(58) Field of Classification Search
None
See application file for complete search history.

(56) References Cited

U.S. PATENT DOCUMENTS

| 7,286,844 B1 * | 10/2007 | Redi ..................... H04W 52/46 |
| | | 455/13.4 |
| 2009/0046712 A1 * | 2/2009 | Nordmark ............. H04W 40/18 |
| | | 370/389 |

(Continued)

FOREIGN PATENT DOCUMENTS

| JP | 2006-211200 A | 8/2006 |
| WO | WO 2008/105039 A1 | 9/2008 |

OTHER PUBLICATIONS

European Patent Office, Patent Search Report dated Apr. 30, 2018 regarding EP Patent Application No. 18152103.0 (Corresponding to this US Patent Application).

(Continued)

*Primary Examiner* — Phirin Sam
(74) *Attorney, Agent, or Firm* — Li & Cai Intellectual Property (USA) Office (57) ABSTRACT

A node receives, from a center node, a request packet including a data part in which a MAC address and position information of the center node are described, determines whether or not there is a request destination node, where determining that there is the request destination node, additionally describes a MAC address and position information of the node itself in the data part, and transmits the described request packet to the request destination node, where determining that there is no request destination node, determines that the node itself is a terminal node, where determining that the node itself is the terminal node, generates a reply packet including a data part in which all of MAC addresses and all pieces of position information described in the data part of the received request packet are described, and transmits the reply packet to a request source node.

11 Claims, 8 Drawing Sheets

(51) Int. Cl.
H04L 12/721 (2013.01)
H04L 12/707 (2013.01)
H04W 84/18 (2009.01)
H04L 12/733 (2013.01)

(52) U.S. Cl.
CPC .............. H04L 45/34 (2013.01); H04L 45/36 (2013.01); *H04L 45/20* (2013.01); *H04W 84/18* (2013.01)

(56) References Cited

U.S. PATENT DOCUMENTS

| | | | | |
|---|---|---|---|---|
| 2009/0161578 A1* | 6/2009 | Yeung | ................ | H04L 45/00 |
| | | | | 370/254 |
| 2010/0254284 A1* | 10/2010 | Otani | ................ | H04W 84/20 |
| | | | | 370/254 |
| 2013/0227336 A1* | 8/2013 | Agarwal | ............ | H04L 43/0811 |
| | | | | 714/4.3 |
| 2013/0315099 A1* | 11/2013 | Chen | ................ | H04L 45/16 |
| | | | | 370/254 |

OTHER PUBLICATIONS

Chenn-Jung Huang, et al., "A Zone Routing Protocol for Bluetooth MANET with Online Adaptive Zone Radius", Information, Communications and Signal Processing, 2005 Fifth Intranet Ional Conference on Bangkok, Thailand, Dec. 6-9, 2005, Piscataway, NJ, USA, IEEE, Piscataway, NJ, USA, Dec. 6, 2005, pp. 579-583, XP010937383.

* cited by examiner

AD HOC NETWORK ROUTE CONSTRUCTION SYSTEM, NODE, AND CENTER NODE

CROSS REFERENCE TO RELATED APPLICATION

This application claims the benefit of Japanese Priority Patent Application JP 2017-005697 filed Jan. 17, 2017, the entire contents of which are incorporated herein by reference.

BACKGROUND OF THE INVENTION

1. Field of the Invention

The present disclosure relates to an ad hoc network route construction system including one center node and a plurality of nodes (next hop nodes), the nodes (next hop nodes), and the center node.

2. Description of Related Art

There is known an ad hoc network route construction system including one center node and a plurality of next hop nodes.

In the ad hoc network route construction system, a route search packet is flooded a plurality of times. Therefore, it is desirable to reduce the load on the network.

SUMMARY OF THE INVENTION

An ad hoc network route construction system according to an embodiment of the present disclosure includes: a center node; and a plurality of next hop nodes, the center node including a first memory that stores a first information processing program, and a first processor that executes the first information processing program, each of the plurality of next hop nodes including a second memory that stores a second information processing program, and a second processor that executes the second information processing program, in which the first processor of the center node operates to, when the first processor executes the first information processing program, generate a request packet including a data part, a MAC (Media Access Control) address of the center node and position information of the center node being described in the data part, and transmit the request packet to one or more next hop nodes located in an area where the one or more next hop nodes can communicate with the center node, the second processor of each of the one or more next hop nodes operates to, when the second processor executes the second information processing program, receive the request packet, determine whether or not there is a request destination node as a destination of the request packet, where determining that there is the request destination node, additionally describe a MAC address of the next hop node itself and position information of the next hop node itself in the data part of the received request packet, and transmit the described request packet to the request destination node, and where determining that there is no request destination node, determine that the next hop node itself is a terminal node, the second processor of the terminal node operates to, when the second processor executes the second information processing program, generate a reply packet including a data part, all of MAC addresses and all pieces of position information described in the data part of the received request packet being described in the data part of the reply packet, and transmit the reply packet to a request source node as a source of the received request packet, the second processor of each of the one or more next hop nodes excluding the terminal node further operates to, when the second processor executes the second information processing program, receive the reply packet from the request destination node, and transmit the received reply packet to the request source node, and the first processor of the center node further operates to, when the first processor executes the first information processing program, receive one or more reply packets from one or more request destination nodes, and create a routing table based on all of MAC addresses and all pieces of position information described in data parts of the received one or more reply packets.

A node (next hop node) according to an embodiment of the present disclosure is a node, included in ad hoc network route construction system including a center node and a plurality of nodes, each of the nodes including: a second memory that stores a second information processing program; and a second processor that executes the second information processing program, in which the second processor operates to, when the second processor executes the second information processing program, receive, from the center node, a request packet including a data part, a MAC (Media Access Control) address of the center node and position information of the center node being described in the data part, determine whether or not there is a request destination node as a destination of the request packet, where determining that there is the request destination node, additionally describe a MAC address of the next hop node itself and position information of the next hop node itself in the data part of the received request packet, and transmit the described request packet to the request destination node, where determining that there is no request destination node, determine that the next hop node itself is a terminal node, where determining that the next hop node itself is the terminal node, generate a reply packet including a data part, all of MAC addresses and all pieces of position information described in the data part of the received request packet being described in the data part of the reply packet, and transmit the reply packet to a request source node as a source of the received request packet, where determining that the next hop node itself is not the terminal node, receive the reply packet from the request destination node, and transmit the received reply packet to the request source node.

A center node according to an embodiment of the present disclosure is a center node, included in an ad hoc network route construction system including the center node and a plurality of next hop nodes, the center node including a first memory that stores a first information processing program, and a first processor that executes the first information processing program, each of the plurality of next hop nodes including a second memory that stores a second information processing program, and a second processor that executes the second information processing program, in which the first processor of the center node operates to, when the first processor executes the first information processing program, generate a request packet including a data part, a MAC (Media Access Control) address of the center node and position information of the center node being described in the data part, and transmit the request packet to one or more next hop nodes located in an area where the one or more next hop nodes can communicate with the center node, the second processor of each of the one or more next hop nodes operates to, when the second processor executes the second information processing program, receive the request packet, determine whether or not there is a request destination node as a destination of the request packet, where determining that there is the request destination node, additionally describe a MAC address of the next hop node itself and position information of the next hop node itself in the data part of the received request packet, and transmit the described request packet to the request destination node, and where determining that there is no request destination node, determine that the next hop node itself is a terminal node, the second processor of the terminal node operates to, when the second processor executes the second information processing program, generate a reply packet including a data part, all of MAC addresses and all pieces of position information described in the data part of the received request packet being described in the data part of the reply packet, and transmit the reply packet to a request source node as a source of the received request packet, the second processor of each of the one or more next hop nodes excluding the terminal node further operates to, when the second processor executes the second information processing program, receive the reply packet from the request destination node, and transmit the received reply packet to the request source node, and the first processor of the center node further operates to, when the first processor executes the first information processing program, receive one or more reply packets from one or more request destination nodes, and create a routing table based on all of MAC addresses and all pieces of position information described in data parts of the received one or more reply packets.

These and other objects, features and advantages of the present invention will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

1. Overview of Ad Hoc Network Route Construction System

An ad hoc network is a network that does not depend on the infrastructure including a dedicated base station. Specifically, the ad hoc network includes a plurality of nodes. The plurality of nodes are connected to each other by using the relay functions of the terminal apparatuses (nodes) themselves by Wi-Fi (registered trademark), Bluetooth (registered trademark), or the like.

Typically, in order to newly construct a route of the ad hoc network, a specific (arbitrary) one of the plurality of terminal apparatuses (nodes) is set as a center node. The center node floods a request packet for route search to a plurality of nodes (next hop nodes) located in an area where the nodes can communicate with the center node.

The node that receives the request packet additionally describes, in a buffer of the request packet, terminal information of the node itself. The node floods the described request packet to a plurality of nodes (next hop nodes) located in an area where the nodes can communicate with the node. This flooding process is repeated many times for each hopping.

In the case where there is no next hop node, the node that receives the request packet determines that the node itself is a terminal node. The terminal node generates a reply packet in which the terminal information (terminal information of all of the plurality of nodes via which the request packet is transmitted) stored in the buffer of the request packet is described. The terminal node transmits the reply packet to the center node via the plurality of next hop nodes (all of the plurality of nodes via which the request packet is transmitted).

The center node calculates, based on terminal information of each node described in the received reply packet, respective routes between the nodes, and create a routing table. The center node supplies the created routing table to all of the nodes by flooding. Each of the nodes constructs a route based on the routing table.

As described above, typically, in order to newly construct a route of the ad hoc network, a process of flooding the request packet is repeated many times. Therefore, the load on the network is high. In view of the above-mentioned circumstances, according to this embodiment, the load on the network is reduced in the ad hoc network route construction system.

2. Hardware Configuration of Information Processing Apparatus

Figure 1:
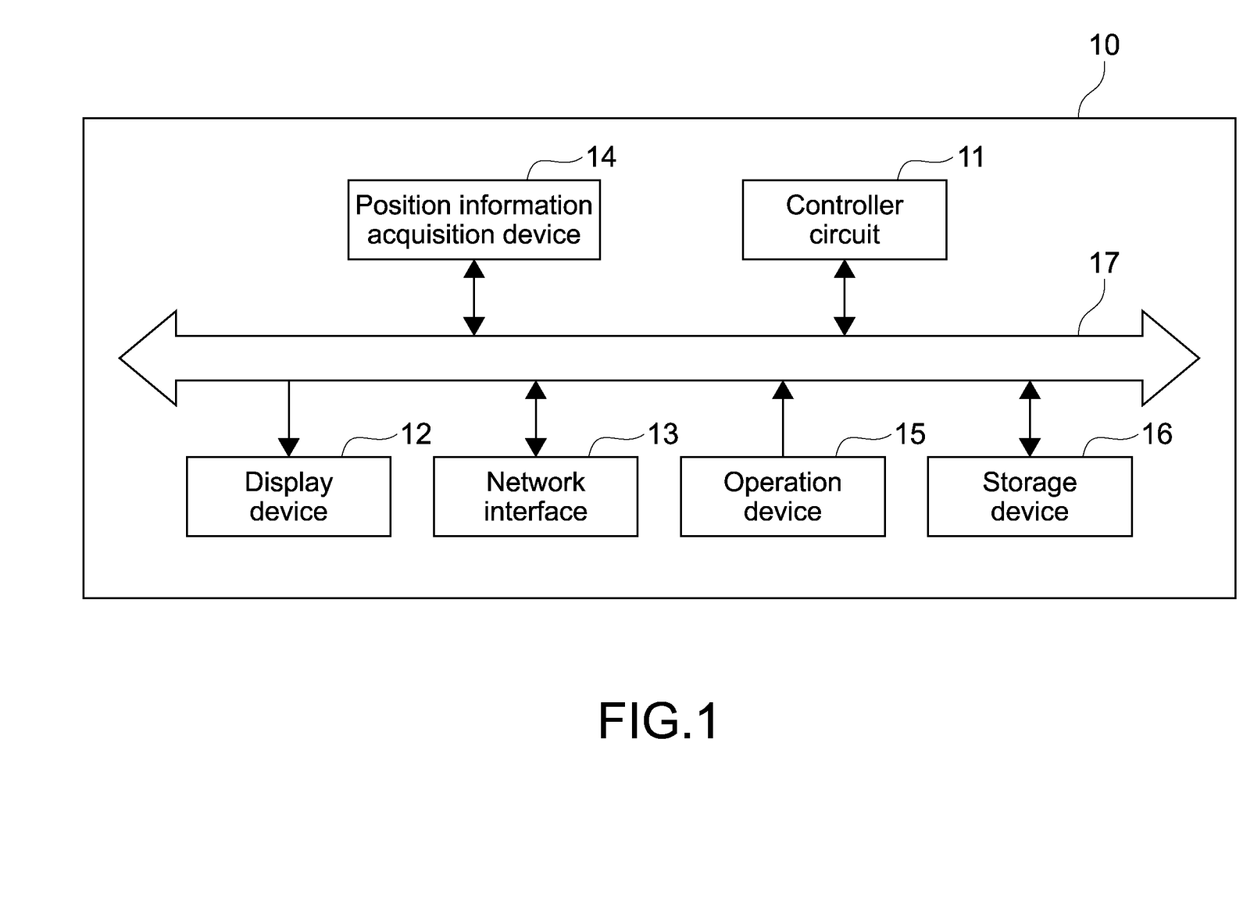
FIG. 1 shows a hardware configuration of an information processing apparatus.

FIG. 1 shows a hardware configuration of an information processing apparatus.

A node is an information processing apparatus having the relay function by Wi-Fi (registered trademark), Bluetooth (registered trademark), or the like, and typically an indoor installation type (not mobile) terminal apparatus. For example, the information processing apparatus is, for example, a desktop personal computer, an image forming apparatus such as an MFP (Multifunction Peripheral), a facsimile, a television receiver, or a household appliance.

An information processing apparatus 10 as a node includes a controller circuit 11, and a display device 12, a network interface 13, an operation device 15, a storage device 16, and a position information acquisition device 14 that are connected to the controller circuit 11 via a bus 17.

The controller circuit 11 includes a CPU (Central Processing Unit) and the like. The CPU of the control circuit 11 loads a program recorded in a ROM (Read Only Memory), which is an example of a non-transitory computer readable recording medium, in a RAM (Random Access Memory) and executes the program The storage device 16 includes a ROM, a RAM, and a large-volume storage device such as an HDD (Hard Disk Drive). The ROM fixedly stores programs to be executed by the controller circuit 11, data, and the like. The programs stored in the ROM are loaded to the RAM.

The display device 12 includes an LCD (Liquid Crystal Display), an organic EL (Electroluminescence) display, or the like. The display device 12 carries out operational processing based on information received from the controller circuit 11 and displays generated image signals on a screen. The display device 12 may be an external display device.

The operation device 15 includes a keyboard, a mouse, a touch panel, and/or various switches. The operation device 15 detects user operations and outputs operation signals to the controller circuit 11.

The network interface 13 is an interface for communicating with another information processing apparatus 10 (node) via Wi-Fi (registered trademark), Bluetooth (registered trademark), or the like.

The position information acquisition device 14 acquires the present position information of the information processing apparatus 10 itself. For example, the position information acquisition device 14 measures, based on the cycle at which Wi-Fi (registered trademark) radio waves transmitted from a plurality of wireless LAN (Local Area Network) access points reach the information processing apparatus 10, the position of the information processing apparatus 10 by using triangulation. Alternatively, the position information acquisition device 14 measures, based on the cycle at which radio waves from a Bluetooth (registered trademark) transmitter (beacon) reach the information processing apparatus 10, the position of the information processing apparatus 10. Further, the position information acquisition device 14 may measure the position of the information processing apparatus 10 by using a GPS (Global Positioning System).

3. Functional Configuration of Ad Hoc Network Route Construction System

Figure 2:
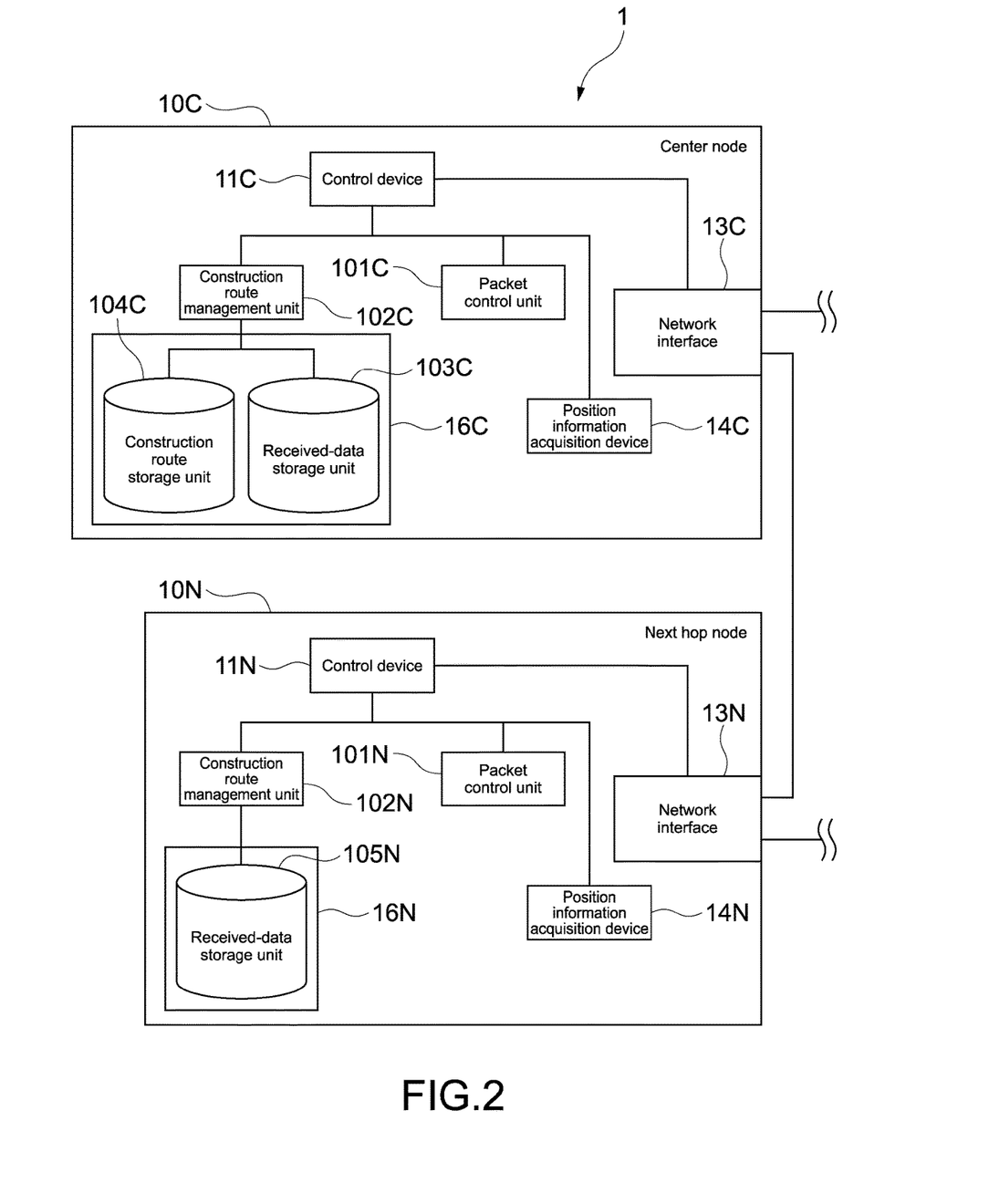
FIG. 2 shows a functional configuration of an ad hoc network route construction system.

FIG. 2 shows a functional configuration of an ad hoc network route construction system.

In the following description, the information processing apparatus 10 as a center node will be referred to as the "center node 10C". A plurality of nodes 10 other than the center node 10C among a plurality of nodes included in the ad hoc network are referred to as the "next hop nodes 10N" for convenience in some cases for the sake of distinguishing them from the center node. That is, an ad hoc network route construction system 1 includes the one center node 10C and the plurality of next hop nodes 10N.

The center node 10C may be arbitrarily decided by a user (administrator). A terminal apparatus (not shown) such as a personal computer receives a user operation, and requests, via Wi-Fi (registered trademark), Bluetooth (registered trademark), or the like, the arbitrary information processing apparatus 10 to function as a center node.

The CPU (first processor) of the center node 10C loads an information processing program (first information processing program) recorded in a ROM (first memory), which is an example of a non-transitory computer readable recording medium, in a RAM and executes the program to thereby operate as the functional blocks, i.e., a packet control unit 101C and a construction route management unit 102C.

The CPU (second processor) of each the next hop nodes 10N loads an information processing program (second information processing program) recorded in a ROM (second memory), which is an example of a non-transitory computer readable recording medium, in a RAM and executes the program to thereby operate as the functional blocks, i.e., a packet control unit 101N and a construction route management unit 102N.

The packet control unit 101C of the center node 10C generates an SFRREQ packet including a data part in which a MAC address and position information of the center node 10C are described. The packet control unit 101C transmits (floods) the SFRREQ packets to the next hop nodes 10N located in an area where the next hop nodes 10N can communicate with the center node 10C.

The packet control unit 101N of each of the next hop nodes 10N receives an SFRREQ packet, and determines whether or not there is the next hop node 10N (request destination node) as the destination of the SFRREQ packet. In the case of determining that there is the request destination node, the packet control unit 101N additionally describes, in the data part of the received SFRREQ packet, the MAC address and position information of the next hop node 10N itself, and transmits the described SFRREQ packet to the next hop node 10N (request destination node). In the case of determining that there is no request destination node, the packet control unit 101N determines that the next hop node 10N itself is a terminal node. In the case of determining that the next hop node 10N itself is a terminal node, the next hop node 10N generates an SFRREP packet including a data part in which all of the MAC addresses and all pieces of position information described in the data part of the received SFRREQ packet are described, and transmits the SFRREP packet to the request source node as a source of the received SFRREQ packet. The next hop node 10N other than the terminal node receives the SFRREP packet from the request destination node, and transmits the received SFRREP packet to the request source node.

The packet control unit 101C of the center node 10C receives SFRREP packets from one or more next hop nodes 10N.

The construction route management unit 102C of the center node 10C creates a routing table based on all of the MAC addresses and all pieces of position information described in the data parts of the one or more received SFRREP packets. The construction route management unit 102C supplies the created routing table to the next hop node 10N.

The construction route management unit 102N of the next hop node 10N acquires the routing table created by the center node 10C.

4. Operational Floor of Center Node and Next Hop Node

Figure 3:
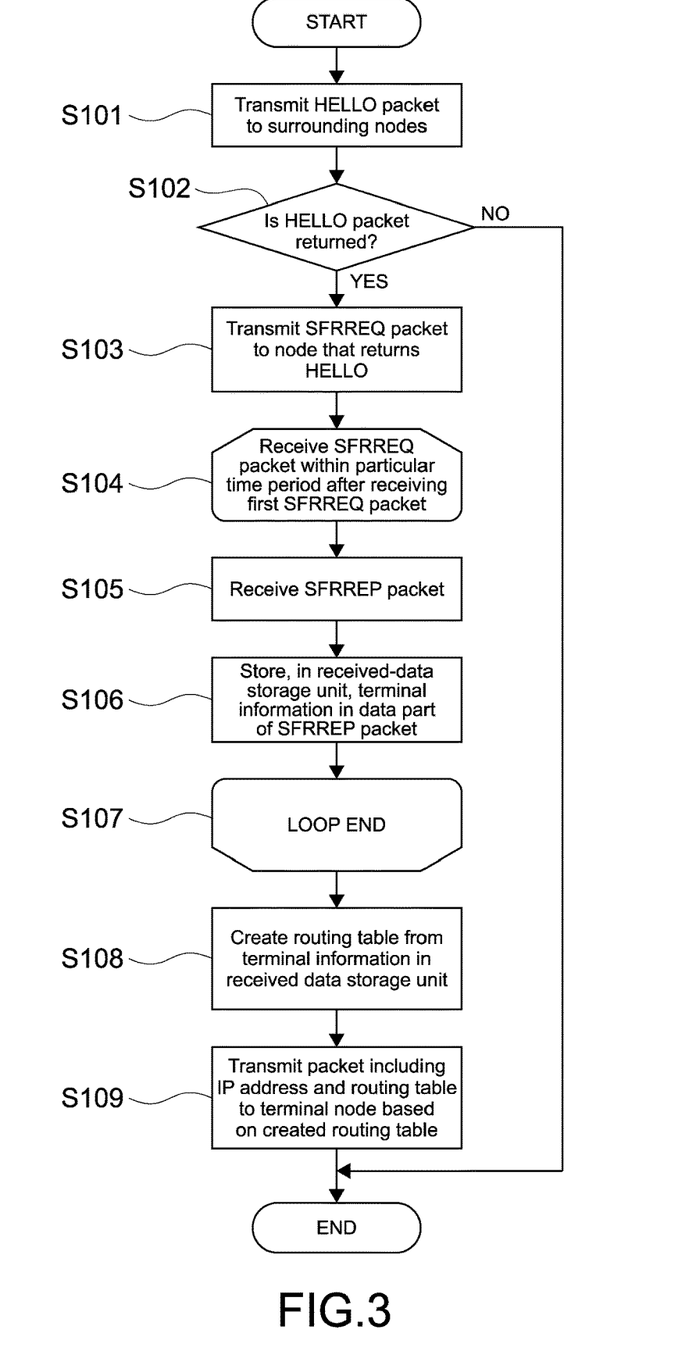
FIG. 3 shows an operational flow of a center node.
Figure 4:
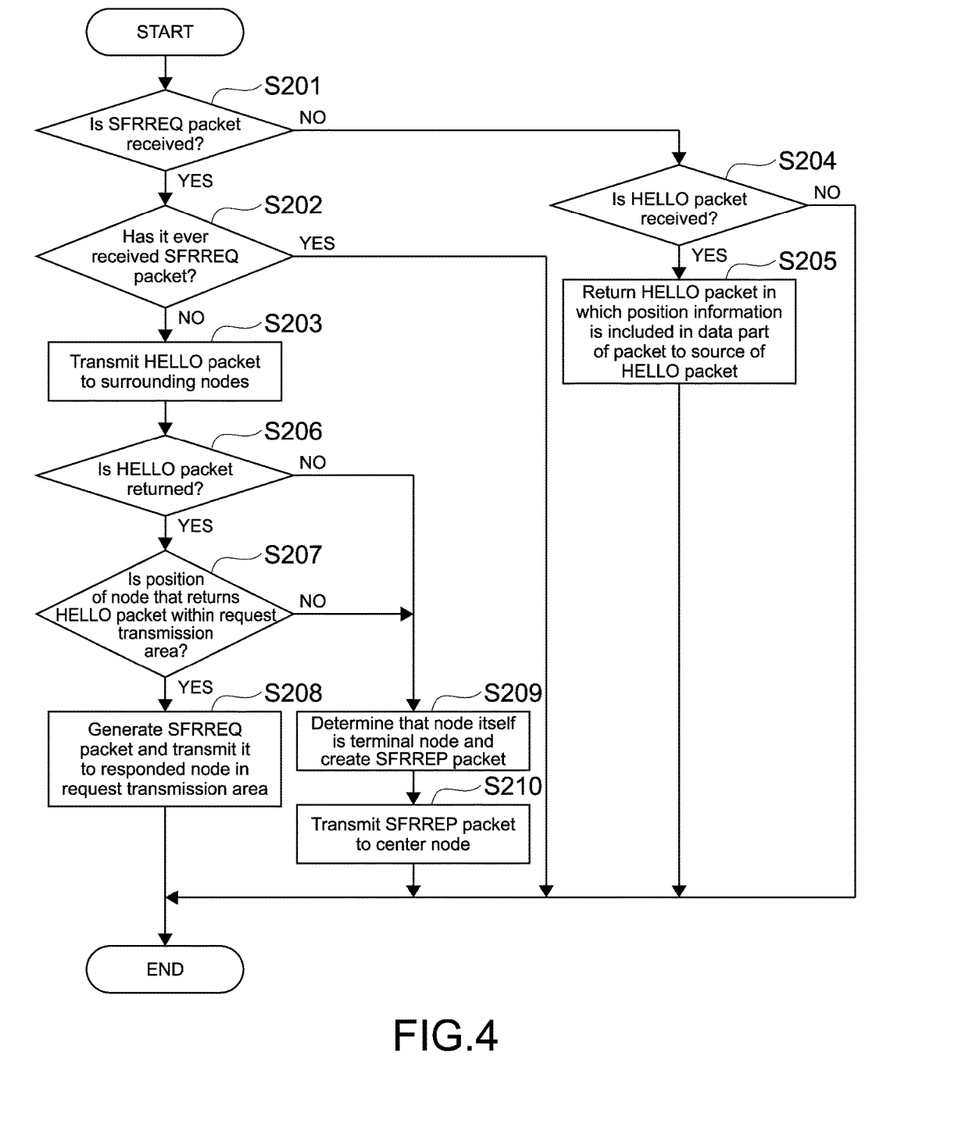
FIG. 4 shows an operational flow of a next hop node.
Figure 5:
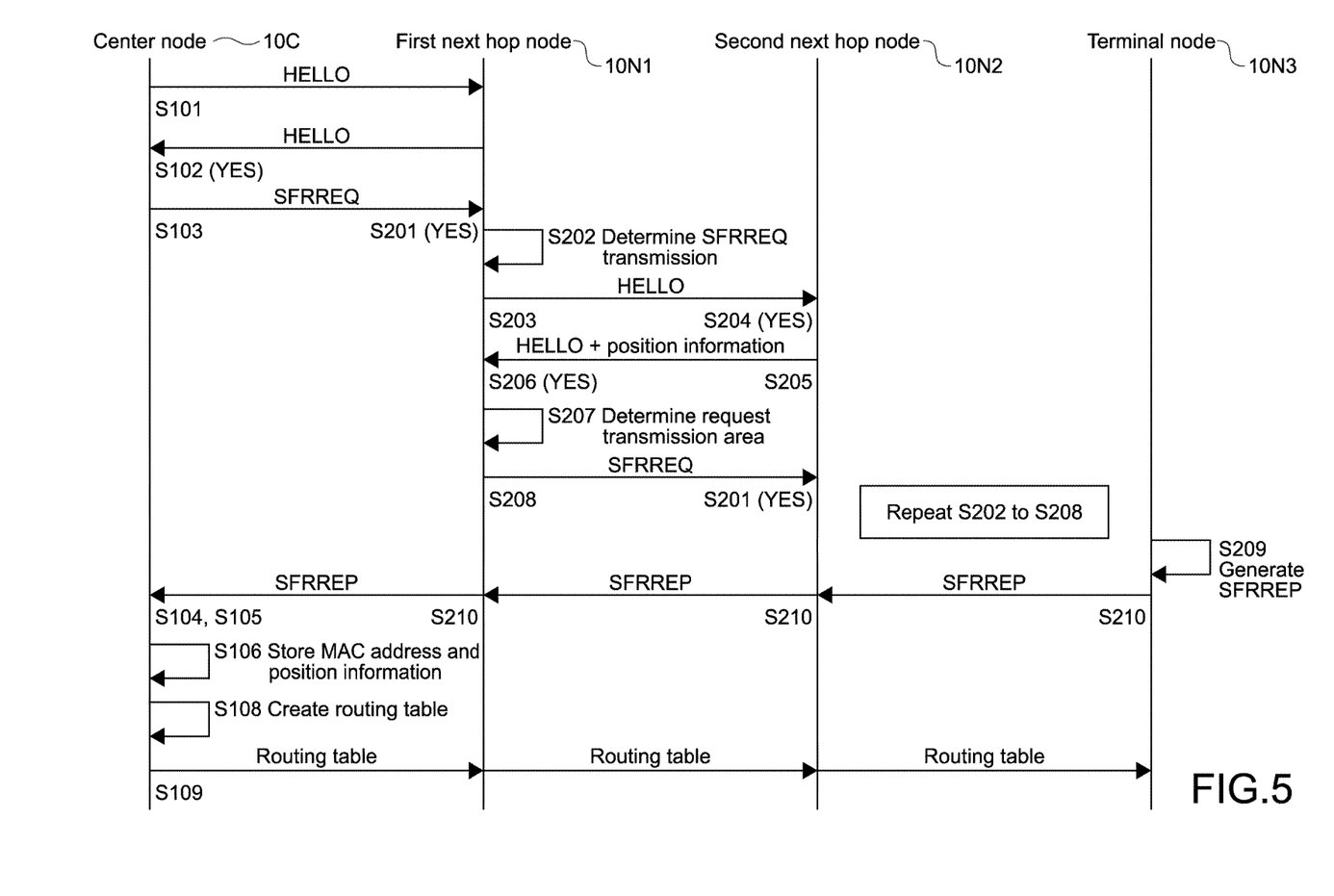
FIG. 5 shows an operational sequence of the center node and the next hop node.

FIG. 3 shows an operational flow of the center node. FIG. 4 shows an operation flow of the next hop node. FIG. 5 shows an operational sequence of the center node and the next hop node.

A controller circuit 11C of the center node 10C transmits, via a network interface 13C (Step S101), HELLO packets to all the next hop nodes 10N with which the center node 10C can communicate. Hereinafter, the next hop nodes 10N as destinations to which the center node 10C transmits the HELLO packets will be referred to as the "first next hop nodes 10N1" for convenience.

A controller circuit 11N of each of the first next hop nodes 10N1 receives the HELLO packet from the center node 10C via a network interface 13N. The controller circuit 11N of the first next hop node 10N1 that receives the HELLO packet transmits the HELLO packet to the center node 10C via the network interface 13N.

The controller circuit 11C of the center node 10C receives the HELLO packets from the plurality of first next hop nodes 10N1 via the network interface 13C (YES in Step S102).

In the case of receiving the HELLO packets, the packet control unit 101C of the center node 10C generates SFRREQ packets as request packets. The packet control unit 101C of the center node 10C transmits, via the network interface 13C, the generated SFRREQ packets by unicast to all of the plurality of first next hop nodes 10N1 (request destination nodes) as sources of the received HELLO packets (Step S103). After transmitting the SFRREQ packets, the center node 10C stands by to receive an SFRREP packet (to be described later).

Now, the "SFRREQ packet" will be described. The "SFRREQ packet" is a packet unique to this embodiment, which is obtained by improving an existing RREQ (Route Request) packet used in the AODV (Ad hoc On-Demand Distance Vector) protocol, and represents "Smart Flooding Route Request packet". The "SFRREQ packet" stores information requisite for constructing a route of the ad hoc network.

Figure 6:
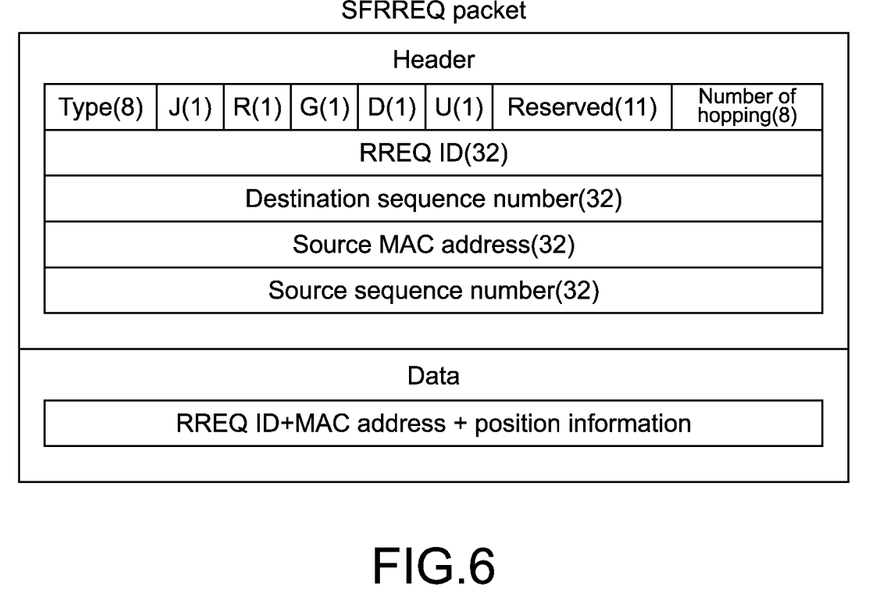
FIG. 6 shows an SFRREQ packet.
Figure 7:
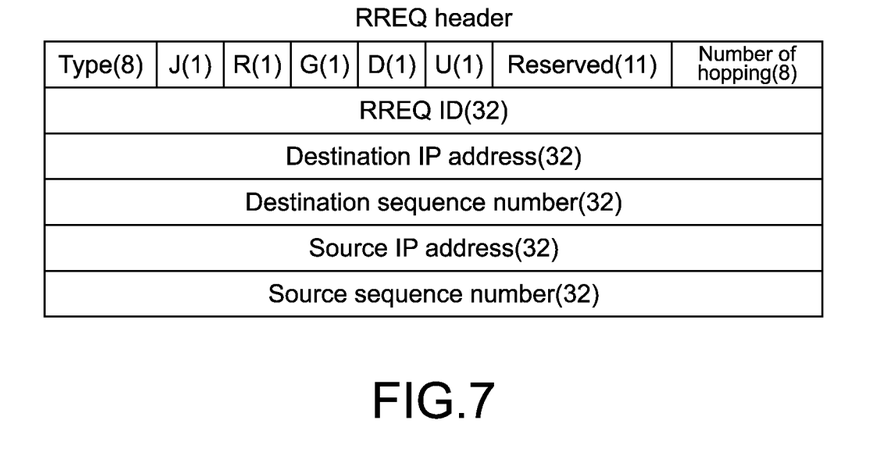
FIG. 7 shows a header of an existing RREQ packet.

FIG. 6 shows an SFRREQ packet. FIG. 7 shows a header of an existing RREQ packet.

In a header (SFRREQ header) (FIG. 6) of an SFRREQ packet according to this embodiment, the change point from the header (RREQ header) (FIG. 7) of the existing RREQ packet is as follows. That is, in the SFRREQ header according to this embodiment, a "source MAC address" is described instead of a "destination IP address" and a "source IP address" in the existing RREQ header. The "source MAC address" is a MAC address of a node as a destination of the SFRREQ packet. In the case of Step S103, the MAC address of the center node 10C is described as the "source MAC address".

The data part of the SFRREQ packet includes an RREQ ID, a MAC address buffer, and a position information buffer. The "RREQ ID" is an ID (identifier) for uniquely identifying the SFRREQ packet. In the "MAC address buffer", a MAC address of a node as a source of this SFRREQ packet is stored (additionally described for each hopping). In the case of Step S103, the MAC address of the center node 10C is described. In the "position information buffer", position information (information acquired by the position information acquisition device 14) of a node as a source of this SFRREQ packet is stored (additionally described for each hopping). In the case of Step S103, position information of the center node 10C acquired by a position information acquisition device 14C is described.

Now, the operational flow will be described again. The packet control unit 101N of each of the first next hop nodes 10N1 (request destination node) that transmit the HELLO packets to the center node 10C receives an SFRREQ packet from the center node 10C via the network interface 13N (YES in Step S201). In the case of receiving the SFRREQ packet, the packet control unit 101N of the first next hop node 10N1 determines whether or not the packet control unit 101N has ever transmitted the SFRREQ packet (Step S202). Assumption is made that the packet control unit 101N of the first next hop node 10N1 determines that the packet control unit 101N has never transmitted the SFRREQ packet (NO in Step S202). In this case, the controller circuit 11N of the first next hop nodes 10N1 transmits, via the network interface 13N, a HELLO packet to all of the next hop nodes 10N with which the first next hop node 10N1 can communicate. Hereinafter, the next hop node 10N as a destination to which the first next hop node 10N1 transmits the HELLO packet will be referred to as the "second next hop node 10N2" for convenience. At this time, the controller circuit 11N of the first next hop nodes 10N1 requests for a response HELLO packet in which position information of the second next hop node 10N2 as a response source is additionally described as a response HELLO packet to the HELLO packet (Step S203). Hereinafter, the "response HELLO packet" represents the HELLO packet in which position information of a node as a response source additionally described.

Assumption is made that the packet control unit 101N of the first next hop nodes 10N1 determines that the packet control unit 101N has transmitted the SFRREQ packet (YES in Step S202). In this case, the first next hop nodes 10N1 finishes the processing without transmitting the HELLO packet. In other words, each of the next hop nodes 10N transmits the SFRREQ packet only one time. Accordingly, it is possible to reduce the possibility that each of the next hop nodes 10N receives the SFRREQ packet from many next hop nodes 10N, and reduce the load on the network.

The packet control unit 101N of each of the first next hop nodes 10N1 performs the following processing by using the stand-by time from when transmitting the HELLO packet to when receiving the response Hello packet. That is, the packet control unit 101N of the first next hop node 10N1 additionally describes the MAC address of the first next hop node 10N1 itself after the MAC address of the center node 10C that is already described in the MAC address buffer in the data part of the SFRREQ packet received from the center node 10C (YES in Step S201). Further, the packet control unit 101N of the first next hop node 10N1 additionally describes the position information of the first next hop node 10N1 itself subsequent to the position information of the center node 10C that is already described in the position information buffer in the data part of the SFRREQ packet. In this way, the packet control unit 101N of the first next hop node 10N1 updates the SFRREQ packet.

The packet control unit 101N of the first next hop node 10N1 calculates the request transmission area and the request transmission disabled area of the first next hop node 10N1 based on the position information of the center node 10C and the position information of the first next hop node 10N1 that are described in the position information buffer of the data part of the SFRREQ packet. Simply speaking, the packet control unit 101N of the first next hop node 10N1 sets, as the request destination node, the node 10 located at the position away from the position of the center node 10C as the source of the SFRREQ packet based on the position information of the center node 10C and the position information of the first next hop node 10N1. A method of calculating the request transmission area and the request transmission disabled area will be described below.

Figure 8:
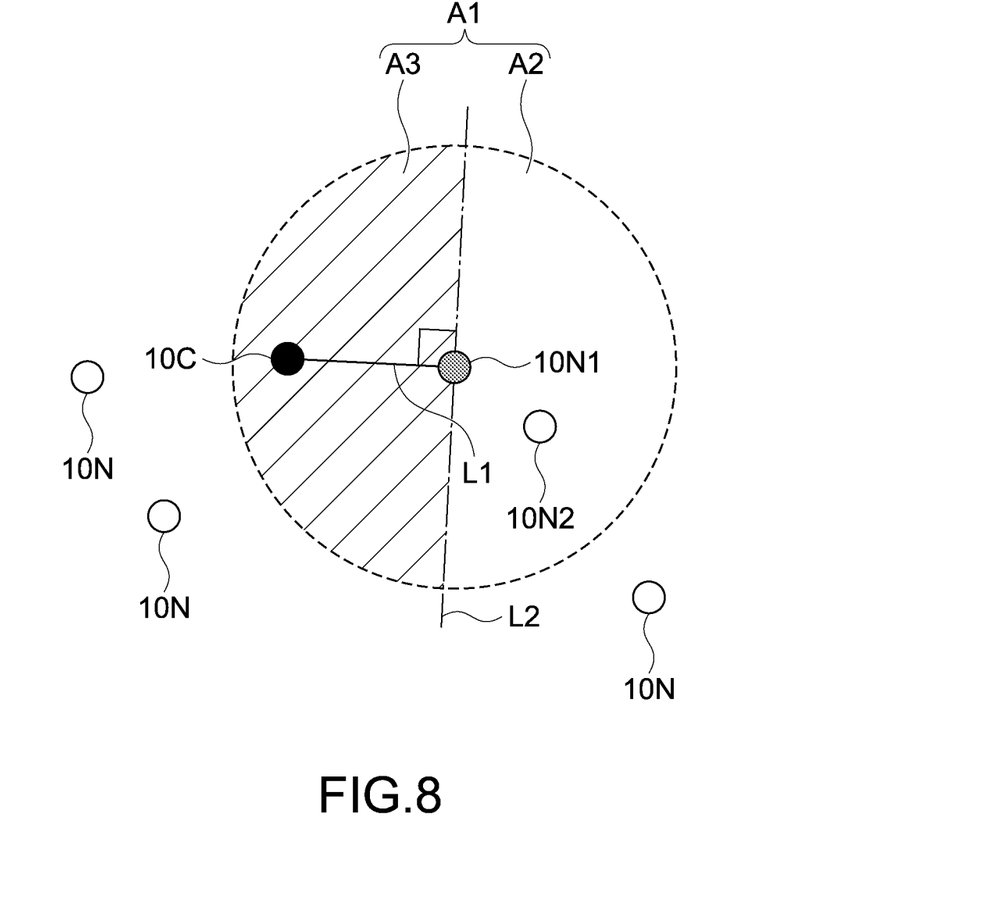
FIG. 8 schematically shows a request transmission area and a request transmission disabled area.

FIG. 8 schematically shows the request transmission area and the request transmission disabled area.

A communicable area A1 has a distance range (schematically shown simply as a circle in FIG. 8) within which the radio wave of the first next hop node 10N1 can reach. The packet control unit 101N of the first next hop node 10N1 divides the communicable area A1 where the first next hop node 10N1 itself can perform communication into two areas A2 and A3 by a straight line L2 that is orthogonal to a line segment L1 and passes through the position of the first next hop node 10N1 itself. The line segment L1 connects the position of the center node 10C as the source of the SFRREQ packet and the position of the first next hop node 10N1. The packet control unit 101N of the first next hop node 10N1 sets the area that does not include the position of the center node 10C as the source of the SFRREQ packet as a request transmission area A2 and the area that includes the position of the center node 10C as a request transmission disabled area A3 out of the two areas A2 and A3 obtained by dividing the communicable area A1.

Now, the operational flow will be described again. The controller circuit 11N of each of the second next hops node 10N2 receives the HELLO packet from the first next hop node 10N1 via the network interface 13N (NO in Step S201, and YES in Step S204). The controller circuit 11N of the second next hop node 10N2 that receives the HELLO packet generates a response HELLO packet obtained by additionally describing the position information (information acquired by a position information acquisition device 14N) of the second next hop node 10N2 itself in the HELLO packet. The controller circuit 11N of the second next hop node 10N2 transmits the response HELLO packet to the first next hop nodes 10N1 via the network interface 13N (Step S205).

The controller circuit 11N of the first next hop node 10N1 receives (or has already received) the response HELLO packet from each of the second next hop nodes 10N2 via the network interface 13N (YES in Step S206). The packet control unit 101N of the first next hop node 10N1 reads the position information of the second next hop node 10N2 itself described in the response HELLO packet. The controller circuit 11N of the first next hop node 10N1 determines whether each of the second next hop nodes 10N2 is located in the calculated request transmission area A2 or the calculated request transmission disabled area A3 (Step S207).

The controller circuit 11N of the first next hop node 10N1 transmits, via the network interface 13N, the updated SFRREQ packet (Step S208) by unicast to all of the second next hop nodes 10N2 (request destination nodes) located in the request transmission area A2 (YES in Step S207). Note that the "updated SFRREQ packet" is an SFRREQ packet in which the MAC address and the position information of the first next hop nodes 10N1 itself are additionally described.

The packet control unit 101N of each of the second next hop nodes 10N2 (request destination nodes) receives the SFRREQ packet from the first next hop node 10N1 via the network interface 13N (YES in Step S201). In the case of receiving the SFRREQ packet, the second next hop node 10N2 itself becomes the request source node, and processing of Step S202 to Step S208 is repeated.

Note that the second next hop node 10N2 updates the SFRREQ packet as follows. The packet control unit 101N of the second next hop node 10N2 additionally described the MAC address of the second next hop node 10N2 itself subsequent to the MAC address of the center node 10C and the subsequent MAC address of the first next hop nodes 10N1 that are already described in the MAC address buffer of the data part of the SFRREQ packet received from the first next hop node 10N1 (Yes in Step S201). Further, the packet control unit 101N of the second next hop node 10N2 additionally described the position information of the second next hop node 10N2 itself subsequent to the position information of the center node 10C and the subsequent position information of the first next hop node 10N1 that are already described in the position information buffer of the data part of the SFRREQ packet.

Note that the second next hop node 10N2 calculates the request transmission area and the request transmission disabled area as follows. The packet control unit 101N of the second next hop node 10N2 divides the communicable area A1 where the second next hop node 10N2 itself can perform communication into the two areas A2 and A3 by the straight line L2 that is orthogonal to the line segment L1 and passes through the position of the second next hop node 10N2 itself. The line segment L1 connects the position of the first next hop nodes 10N1 as the source of the SFRREQ packet and the position of the second next hop node 10N2. The packet control unit 101N of the second next hop node 10N2 sets the area that does not include the position of the first next hop node 10N1 as the source of the SFRREQ packet as the request transmission area A2 and the area that includes the position of the first next hop node 10N1 as the request transmission disabled area A3 out of the two areas A2 and A3 obtained by dividing the communicable area A1.

Meanwhile, the controller circuit 11N of the next hop node 10N transmits the HELLO packet (Step S203) but receives no response HELLO packet from another next hop node 10N (NO in Step S206) in some cases. Alternatively, the controller circuit 11N of the next hop node 10N determines that there is no other next hop node 10N located in the request transmission area A2 (NO in Step S207) in some cases. In these cases, there is no node as a destination of the SFRREQ packet. Therefore, the controller circuit 11N of the next hop node 10N determines that the next hop node 10N is a terminal node. Hereinafter, the next hop node 10N as the terminal node will be referred to as the "terminal node 10N3" for convenience.

The packet control unit 101N of the terminal node 10N3 generates an SFRREP packet as a reply packet (Step S209).

Now, the "SFRREP packet" will be described. The "SFRREP packet" is a packet unique to this embodiment, which is obtained by improving an existing RREP (Route Reply) packet used in the AODV protocol, and represents "Smart Flooding Route Reply packet". The "SFRREP packet" stores information requisite for constructing a route of the ad hoc network.

Figure 9:
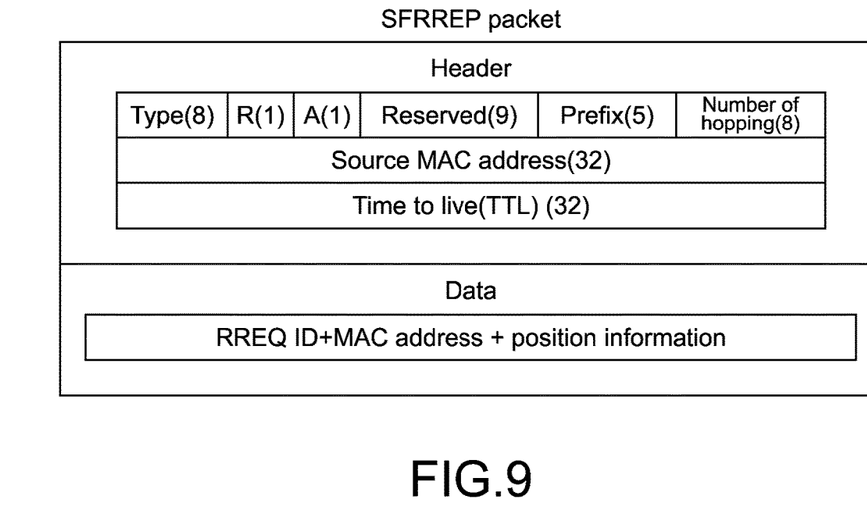
FIG. 9 shows an SFRREP packet.
Figure 10:
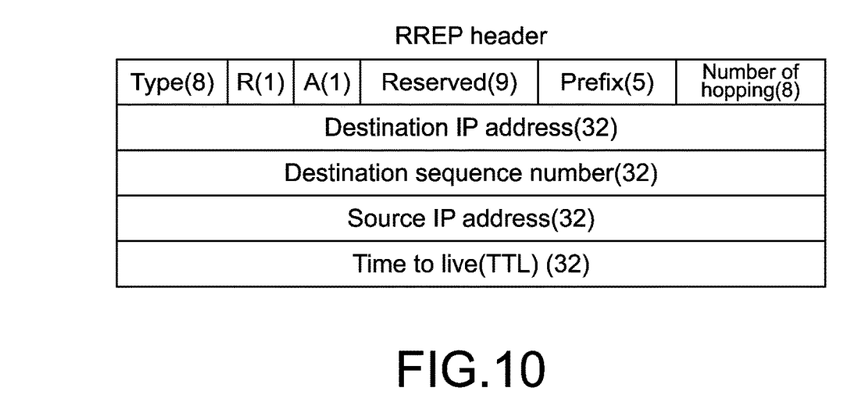
FIG. 10 shows a header of an existing RREP packet.

FIG. 9 shows an SFRREP packet. FIG. 10 shows a header of the existing RREP packet.

In the header (SFRREP header) (FIG. 9) of the SFRREP packet according to this embodiment, the change point from the header (RREP header) (FIG. 10) of the existing RREP packet is as follows. That is, in the SFRREP header according to this embodiment, a "source MAC address" is described instead of a "destination IP address", a "destination sequence number", and a "source IP address" of the existing RREP header. The "source MAC address" is the MAC address of the terminal node 10N3 as a source of the SFRREP packet.

The data part of the SFRREP packet is completely the same as the data part of the SFRREQ packet acquired by the terminal node 10N3. That is, the data part of the SFRREP packet includes the RREQ ID, the MAC address buffer, and the position information buffer. The "RREQ ID" is an ID for uniquely identifying the SFRREQ packet acquired by the terminal node 10N3. In the "MAC address buffer", the MAC addresses of nodes from the center node 10C to the terminal node 10N3 are stored in the order of hopping. In the "position information buffer", the pieces of position information of nodes from the center node 10C to the terminal node 10N3 are stored in the order of hopping.

Now, the operation flow will be described again. The packet control unit 101N of the terminal node 10N3 transmits the generated SFRREP packet to the center node 10C by referring to the MAC addresses stored in the order of hopping in the MAC address buffer to trace the plurality of next hop nodes 10N in the order of being newly stored in the MAC address buffer (in the order of hopping) (Step S210).

Specifically, the packet control unit 101N of the terminal node 10N3 transmits the generated SFRREP packet to the next hop node 10N (e.g., the second next hop node 10N2) (request source node) as a source of the received SFRREQ packet. The packet control unit 101N of the second next hop node 10N2 receives from the SFRREP packet from the terminal node 10N3 (request destination node), and transmits the received SFRREP packet to the first next hop nodes 10N1 (request source node). The packet control unit 101N of the first next hop node 10N1 receives the SFRREP packet from the second next hop node 10N2 (request destination node), and transmits the received SFRREP packet to the center node 10C (request source node).

The packet control unit 101C of the center node 10C receives SFRREP packets from all of the plurality of first next hop nodes 10N1 (request destination nodes) as destinations of SFRREQ packets via the network interface 13C (Steps S104 and S105). Specifically, the packet control unit 101C of the center node 10C receives SFRREP packets from the plurality of first next hop nodes 10N1 within a particular time period (arbitrary time length) after receiving the SFRREP packet first. The packet control unit 101C of the center node 10C supplies the received SFRREP packet to the construction route management unit 102C.

The construction route management unit 102C of the center node 10C puts the received plurality of SFRREP packets in a queue in the order of arrival, and stores information described in each SFRREP packet in a storage device 16C in order for each SFRREP packet. Specifically, the construction route management unit 102C stores, in received-data storage unit 104C of the storage device 16C, all of the MAC addresses described in the MAC address buffers and all pieces of position information described in the position information buffers, which are included in data parts of the SFRREP packets (Step S106).

In the case where the packet control unit 101C of the center node 10C receives no SFRREP packet for a specific time period, the packet control unit 101C stops the reception of the SFRREP packet at arbitrary timing (e.g., three minutes later after receiving the first SFRREP packet) (Step S107).

Next, the construction route management unit 102C of the center node 10C creates a routing table based on the MAC address and the position information stored in the received-data storage unit 104C. Specifically, the construction route management unit 102C assigns an IP address to each of the next hop nodes 10N for each of the MAC addresses of the next hop nodes 10N, and creates a routing table (Step S108). The routing table represents the connection between the nodes 10. The construction route management unit 102C stores the created routing table in a construction route storage unit 103C of the storage device 16C.

The construction route management unit 102C of the center node 10C transmits, based on route information of the created routing table, a packet including the IP address and the routing table, to each of the next hop nodes 10N (Step S109).

The construction route management unit 102N of each of the next hop nodes 10N receives the packet including the IP address and the routing table via the network interface 13N. The construction route management unit 102N stores, in a received-data storage unit 105N of a storage device 16N, the IP address and the routing table included in the received packet. Each of the next hop nodes 10N establishes a data link based on the IP address and the routing table to construct an ad hoc network.

5. Conclusion

Typically, there is known a technology in which each node transmits packets to surrounding next hop nodes by broadcasting without distinction to newly construct a route of an ad hoc network. According to this technology, the load on a network or the consumption of memory resources are increased as the number of nodes is increased. Further, in the case where manual input is necessary to search for a communication route, more time and effort are needed as the number of nodes is increased.

Meanwhile, according to this embodiment, all of the next hop nodes 10N excluding the center node 10C transmit the SFRREQ packet only one time (Steps S202 and S203). Accordingly, it is possible to reduce the possibility that each of the next hop nodes 10N receives the SFRREQ packet from many next hop nodes 10N.

Further, according to this embodiment, all of the next hop nodes 10N excluding the center node 10C transmit the SFRREQ packet to only the next hop node 10N located in a part (request transmission area A2) of the communicable area A1 (Steps S207 and S208). Accordingly, it is possible to further reduce the possibility that each of the next hop nodes 10N receives the SFRREQ packet from many next hop nodes 10N.

Specifically, according to this embodiment, the next hop node 10N requests, from one or more different next hop nodes 10N, a response HELLO packet in which position information of the different next hop nodes 10N as request sources is additionally described, as a response packet to the HELLO packet (Step S203). Accordingly, since the next hop node 10N can acquire the position information of the different next hop node 10N before transmitting the SFRREQ packet, it is possible to reliably narrow the transmission target of the SFRREQ packet.

Further, according to this embodiment, the center node 10C assigns an IP address to each of the next hop nodes 10N, and creates a routing table (Step S108). Accordingly, only the center node 10C includes the construction route storage unit 103C for storing information requisite for constructing a route, and each of the next hop nodes 10N includes no construction route storage unit 103C. Therefore, it is possible to reduce the resources consumed by each of the next hop nodes 10N. Further, it is possible to reduce the amount of packets transmitted/received in the network, and reduce the load on the network.

As described above, according to this embodiment, it is possible to reduce the load on the network, reduce the memory resources consumed by each node, and eliminate the manual operation.

It should be understood by those skilled in the art that various modifications, combinations, sub-combinations and alterations may occur depending on design requirements and other factors insofar as they are within the scope of the appended claims or the equivalents thereof.

What is claimed is:

1. An ad hoc network route construction system, comprising:
   a center node; and
   a plurality of next hop nodes,
   the center node including
      a first memory that stores a first information processing program, and
      a first processor that executes the first information processing program,
   each of the plurality of next hop nodes including
      a second memory that stores a second information processing program, and
      a second processor that executes the second information processing program, wherein
   the first processor of the center node operates to, when the first processor executes the first information processing program,
      generate a request packet including a data part, a MAC (Media Access Control) address of the center node and position information of the center node being described in the data part, and transmit the request packet to one or more next hop nodes located in an area where the one or more next hop nodes can communicate with the center node, the second processor of each of the one or more next hop nodes operates to, when the second processor executes the second information processing program, receive the request packet, determine whether or not there is a request destination node as a destination of the request packet, where determining that there is the request destination node, additionally describe a MAC address of the next hop node itself and position information of the next hop node itself in the data part of the received request packet, and transmit the described request packet to the request destination node, and where determining that there is no request destination node, determine that the next hop node itself is a terminal node, the second processor of the terminal node operates to, when the second processor executes the second information processing program, generate a reply packet including a data part, all of MAC addresses and all pieces of position information described in the data part of the received request packet being described in the data part of the reply packet, and transmit the reply packet to a request source node as a source of the received request packet, the second processor of each of the one or more next hop nodes excluding the terminal node further operates to, when the second processor executes the second information processing program, receive the reply packet from the request destination node, and transmit the received reply packet to the request source node, and the first processor of the center node further operates to, when the first processor executes the first information processing program, receive one or more reply packets from one or more request destination nodes, and create a routing table based on all of MAC addresses and all pieces of position information described in data parts of the received one or more reply packets.

2. The ad hoc network route construction system according claim 1, wherein the second processor of each of the one or more next hop nodes operates to, when the second processor executes the second information processing program, to determine whether or not there is the request destination node, read position information of the request source node from the data part of the received request packet, and determine, based on the position information of the request source node and the position information of the next hop node itself, whether or not there is the request destination node located at a position away from a position of the request source node.

3. The ad hoc network route construction system according to claim 2, wherein the second processor of each of the one or more next hop nodes operates to, when the second processor executes the second information processing program, to determine whether or not there is the request destination node, divide an area, in which the next hop node itself can perform communication, into two communicable areas by a straight line that is orthogonal to a line segment and passes through the position of the next hop node itself, the line segment connecting the position of the request source node and the position of the next hop node itself, and determine whether or not there is the request destination node located in the area including no position of the request source node out of the two communicable areas.

4. The ad hoc network route construction system according to claim 3, wherein the second processor of each of the next hop nodes operates to, when the second processor executes the second information processing program, when receiving request packets from a plurality of request source nodes, additionally describe the MAC address of the next hop node itself and the position information of the next hop node itself in the data part of one of the received request packets, and transmit the described request packet to the request destination node.

5. The ad hoc network route construction system according to claim 4, wherein the second processor of each of the one or more next hop nodes operates to, when the second processor executes the second information processing program, to determine whether or not there is the request destination node, transmit a HELLO packet to one or more different next hop nodes located in an area, in which the one or more different next hop nodes can communicate with the next hop node itself, request, from the one or more different next hop nodes, a response packet in which position information of the one or more different next hop nodes as response sources is additionally described, as a response packet to the HELLO packet, receive, from the one or more different next hop nodes, the response packet in which the position information of the one or more different next hop nodes is additionally described, and determine whether or not there is the request destination node based on the position information of the one or more different next hop nodes additionally described in the received packet.

6. A node, included in ad hoc network route construction system including a center node and a plurality of nodes, each of the nodes comprising:

a second memory that stores a second information processing program; and a second processor that executes the second information processing program, wherein the second processor operates to, when the second processor executes the second information processing program, receive, from the center node, a request packet including a data part, a MAC (Media Access Control) address of the center node and position information of the center node being described in the data part, determine whether or not there is a request destination node as a destination of the request packet,
where determining that there is the request destination node,
additionally describe a MAC address of the next hop node itself and position information of the next hop node itself in the data part of the received request packet, and
transmit the described request packet to the request destination node,
where determining that there is no request destination node,
determine that the next hop node itself is a terminal node,
where determining that the next hop node itself is the terminal node,
generate a reply packet including a data part, all of MAC addresses and all pieces of position information described in the data part of the received request packet being described in the data part of the reply packet, and
transmit the reply packet to a request source node as a source of the received request packet,
where determining that the next hop node itself is not the terminal node,
receive the reply packet from the request destination node, and
transmit the received reply packet to the request source node.

7. The node according to claim 6, wherein
the second processor operates to, when the second processor executes the second information processing program,
to determine whether or not there is the request destination node,
read position information of the request source node from the data part of the received request packet, and
determine, based on the position information of the request source node and the position information of the next hop node itself, whether or not there is the request destination node located at a position away from a position of the request source node.

8. The node according to claim 7, wherein
the second processor operates to, when the second processor executes the second information processing program,
to determine whether or not there is the request destination node,
divide an area, in which the next hop node itself can perform communication, into two communicable areas by a straight line that is orthogonal to a line segment and passes through the position of the next hop node itself, the line segment connecting the position of the request source node and the position of the next hop node itself, and
determine whether or not there is the request destination node located in the area including no position of the request source node out of the two communicable areas.

9. The node according to claim 8, wherein
the second processor operates to, when the second processor executes the second information processing program,
when receiving request packets from a plurality of request source nodes,
additionally describe the MAC address of the next hop node itself and the position information of the next hop node itself in the data part of one of the received request packets, and
transmit the described request packet to the request destination node.

10. The node according to claim 9, wherein
the second processor operates to, when the second processor executes the second information processing program,
when the second processor executes the second information processing program,
to determine whether or not there is the request destination node,
transmit a HELLO packet to one or more different next hop nodes located in an area, in which the one or more different next hop nodes can communicate with the next hop node itself,
request, from the one or more different next hop nodes, a response packet in which position information of the one or more different next hop nodes as response sources is additionally described, as a response packet to the HELLO packet,
receive, from the one or more different next hop nodes, the response packet in which the position information of the one or more different next hop nodes is additionally described, and
determine whether or not there is the request destination node based on the position information of the one or more different next hop nodes additionally described in the received packet.

11. A center node, included in an ad hoc network route construction system including the center node and a plurality of next hop nodes,
the center node including
a first memory that stores a first information processing program, and
a first processor that executes the first information processing program,
each of the plurality of next hop nodes including
a second memory that stores a second information processing program, and
a second processor that executes the second information processing program, wherein
the first processor of the center node operates to, when the first processor executes the first information processing program,
generate a request packet including a data part, a MAC (Media Access Control) address of the center node and position information of the center node being described in the data part, and
transmit the request packet to one or more next hop nodes located in an area where the one or more next hop nodes can communicate with the center node,
the second processor of each of the one or more next hop nodes operates to, when the second processor executes the second information processing program,
receive the request packet,
determine whether or not there is a request destination node as a destination of the request packet,
where determining that there is the request destination node,
additionally describe a MAC address of the next hop node itself and position information of the next hop node itself in the data part of the received request packet, and transmit the described request packet to the request destination node, and where determining that there is no request destination node, determine that the next hop node itself is a terminal node, the second processor of the terminal node operates to, when the second processor executes the second information processing program, generate a reply packet including a data part, all of MAC addresses and all pieces of position information described in the data part of the received request packet being described in the data part of the reply packet, and transmit the reply packet to a request source node as a source of the received request packet, the second processor of each of the one or more next hop nodes excluding the terminal node further operates to, when the second processor executes the second information processing program, receive the reply packet from the request destination node, and transmit the received reply packet to the request source node, and the first processor of the center node further operates to, when the first processor executes the first information processing program, receive one or more reply packets from one or more request destination nodes, and create a routing table based on all of MAC addresses and all pieces of position information described in data parts of the received one or more reply packets.

\* \* \* \* \*